AMPLITUDE MODULATED PENTODE WITH LINEARITY CONTROL

Filed Feb. 21, 1955 2 Sheets-Sheet 1

INVENTOR.
SOL ZECHTZER
BY
[signature]
ATTORNEY

March 29, 1960 S. ZECHTZER 2,930,994

AMPLITUDE MODULATED PENTODE WITH LINEARITY CONTROL

Filed Feb. 21, 1955 2 Sheets-Sheet 2

INVENTOR.
SOL ZECHTZER

BY

Harold V. Hazeltine

ATTORNEY 2,930,994
Patented Mar. 29, 1960

2,930,994

AMPLITUDE MODULATED PENTODE WITH LINEARITY CONTROL

Sol Zechtzer, Philadelphia, Pa., assignor to Philco Corporation, Philadelphia, Pa., a corporation of Pennsylvania Application February 21, 1955, Serial No. 489,559

7 Claims. (Cl. 332—37)

This invention relates generally to electronic circuits and more particularly to an amplitude modulating circuit having a gain characteristic which varies linearly as a function of the modulating signal over an unusually wide range.

There are in the prior art amplitude modulating circuits employing pentode amplifier stages in which both the modulating signal and the carrier signal are supplied to the control grid electrode. The use of a pentode amplifier stage in an amplitude modulator provides several advantages over other methods of amplitude modulation, such as for example those employing triodes. One of these advantages is that the carrier signal can be large compared to that which can be used with a triode since the plate of the pentode will not be appreciably affected thereby and thus introduce distortion, as would happen in the case of a triode where the carrier signal is applied to the control grid. The large carrier signal permits a high signal-to-noise ratio. Further, because of the high plate impedance of the pentode and the low input capacitance, the phase shift is small compared to that produced by a triode in which the plate impedance is relatively small and the input capacitance relatively large.

In the aforementioned prior art modulating circuits utilizing pentodes the screen grid is maintained at a fairly constant value by some expedient such as connecting it to a battery supply through an impedance. The range of this circuit as a linear amplitude modulator, wherein the gain varies as a linear function of the control grid potential, is limited by two principal factors. First the screen grid potential will decrease in a non-linear manner as the plate current increases to produce increasingly greater non-linearity in the gain versus control grid potential relationship. Consequently the maximum plate current within a substantially linear operating range is thereby limited. Secondly the fact that the screen grid is connected to a battery supply limits the plate current since the plate current is proportional, in a non-linear manner, to the potential of the screen grid.

It is a characteristic of a pentode that the gain thereof will vary as a function of the screen grid potential so that, as the screen grid potential increases in a linear manner, the gain of the pentode will increase in a greater than linear manner. The variations in gain produced by varying the screen grid potential are in addition to the variations produced by varying the potential of the control grid. This characteristic can be employed in the following manner. If the potential of the screen grid and the control grid are increased simultaneously by signals having the same waveform but different amplitude levels, the non-linear increase in gain of the pentode as the screen grid potential is increased is such as to compensate for the non-linearity of gain introduced by the increase in screen grid current as the control grid potential, and thus the plate current, increases. The amplitude level of the signal applied to the screen grid can be such as to approximately compensate for the non-linearity of gain introduced into the circuit by the drop in screen grid potential owing to the increased screen grid current, or it can be large enough to substantially over-compensate for any such loss of non-linearity of gain. Thus the maximum usable plate current will be substantially increased not only because the linearity of variation of gain versus control grid potential at high plate currents is improved, but also because the potential of the screen grid is increased at high plate currents. In addition to increasing the operating range of the tube and improving linearity, the simultaneous application of the same signal of different amplitude levels to both the screen grid and the control grid has the following advantage.

The variation in transconductance or gain for a given change in control grid potential is increased thus providing a larger modulated signal for an applied modulating signal which causes the control grid to operate above its normal bias, and providing a smaller modulated signal for an applied modulating signal which causes the control grid to operate below its normal bias, than in the instance where the screen grid is connected to a constant battery supply through an impedance as is done in the prior art. The application of a proportional amount of the modulating signal to the screen grid does not lessen the other advantages of employing a pentode as set forth hereinbefore.

There are numerous applications for a circuit having a large variation of gain in which the gain is substantially linearly responsive to variations in the amplitude of the modulating signal. One example of such an application occurs in circuits wherein it is desired to have the envelope of the modulated signal increase linearly as a function of time over a period of, for example, several seconds. The art of guided missiles utilizes such a circuit. The missile is guided by a radar system which detects the angle of deviation of the missile from the proper course and then transmits a signal to correct the deviation. The system requires that the amplitude of the correcting signal increase as a linear function in accordance with the distance between the missile and the launching site. This distance increases linearly with time so the amplitude of the correcting signal must also increase linearly as a function of time. The percentage of modulation required in this signal is fairly large. Phase shift is undesirable because of crosstalk.

The generation of such a correction signal formerly was accomplished by mechanism including a servo-driven potentiometer arrangement which had poor reliability, was difficult to adjust, and was expensive. However even this rather undesirable electro-mechanical arrangement was superior to any known form of electronic circuit for this particular application. One application of the present invention is designed to perform the function of the aforementioned mechanism to produce a modulated signal whose amplitude increases linearly with time. At the other end of the frequency range, the need for modulators which will respond to audio and video frequency signals is well known.

An object of the invention is to provide an amplifier which has an unusually wide variation of gain.

Another object of the invention is to provide an amplifier which has an unusually wide variation of gain and in which the gain varies substantially linearly as a function of the amplitude of the input signal.

A further object of the invention is to provide an amplitude modulator circuit having a gain characteristic which varies in a substantially linear manner over an unusually wide range with variations in the modulating signal up to almost 100 percent modulation.

Another object of the invention is to provide an amplitude modulator circuit having a gain characteristic which varies in a substantially linear manner over an unusually wide range extending from D.C. modulating signals to modulating signals having relatively high frequencies.

Another object of the invention is to provide an amplitude modulating circuit having a gain characteristic which varies in a substantially linear manner over an unusually wide range and having a negligible change in phase shift over its operating range and further having a high signal-to-noise ratio.

A further object of the invention is the improvement of amplitude modulating circuits generally.

In accordance with the invention there is provided a pentode vacuum tube. Means are provided to supply an input signal to the control grid circuit thereof to cause the control grid cathode bias to vary in accordance with variations in the amplitude of the said input signal. Other means are provided to supply the same input signal, but at a different amplitude level, to the screen grid circuit of the pentode to increase the variation of gain for a given change in control grid potential and to increase the range of operation of the tube in which the gain varies substantially linearly as a function of the variations of the control grid potential.

When the above defined structure is employed as an amplitude modulator the signal to be modulated is supplied to the control grid electrode. The modulating signal is supplied to the control grid, the screen grid, and the anode of the pentode.

In accordance with a feature of the invention when employed as an amplitude modulator, the anode of the pentode is connected to the modulating source through an anode load impedance thus impressing a proportionate amount of the modulating signal on said anode to compensate for a decrease in anode potential as the plate current increases, thus maintaining the potential of the anode above the knee of the anode current versus anode potential curve. However, in order to prevent the changes in plate current from producing, at the output of the modulating source, undesirable voltage variations which would be supplied back to the control grid and screen grid of the pentode, a low impedance modulating signal source is employed.

In accordance with a particular application of the invention there is provided a specific example of a low impedance modulating source which is constructed to produce a modulating signal whose amplitude increases linearly over a period of several seconds to a predetermined value at which point it is caused to remain constant. This particular modulating signal source is comprised of a cathode follower circuit employing a single triode vacuum tube which performs the dual function of presenting a low impedance to the pentode plate current, and which further functions to generate the desired modulating signal waveform. The cathode of the triode is connected to the control grid thereof through a feedback circuit. Further means are constructed to apply the potential of a charging capacitor to the control grid of the triode. The feedback means functions to maintain a substantially constant charging potential across said capacitor to cause a linear rise in the potential of said control grid and also the cathode of said triode. Circuit means comprising a voltage limiting means are provided to produce the desired modulating signal whose amplitude rises linearly with the potential of the cathode of the triode to a certain value where the voltage limiting means functions to maintain the said amplitude at a constant value. Appropriate circuit means are provided to impress a proportionate amount of said modulating signal upon the control grid and also upon the screen grid of said pentode. The output of the cathode follower circuit is supplied to the plate circuit of the pentode to present a low impedance to the plate current thereof and further to compensate for changes in the potential of the plate owing to variations in the potential of the control grid thereof which are caused by the modulating signal.

The above-mentioned and other objects and features of the invention will be more fully understood from the detailed description thereof when read in conjunction with the drawings in which.

Figure 1:
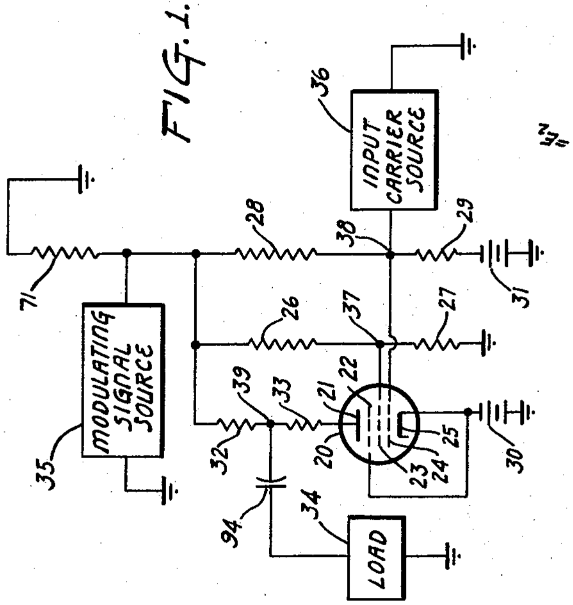
Fig. 1 is a combined block diagram and schematic sketch of one embodiment of the invention.

Referring now to Fig. 1 the input carrier source 36 is constructed to provide a carrier signal of any convenient frequency to the control grid 24 of the pentode 20 which also includes a plate 21, a suppressor grid 22, a screen grid 23, and a cathode 25. The modulating signal source 35 is constructed to produce a desired functional signal such as, for example, a sawtooth waveform or an audio signal which is utilized to modulate the amplitude of the signal from the source 36. This functional signal is developed across the resistance 71 and is impressed upon the control grid 24 by means of resistors 28 and 29, having a junction 38 therebetween which is connected to the control grid 24. Resistor 29 of this voltage divider is connected to the source of grid bias potential represented by battery 31.

In order to obtain good linearity of gain over a substantially larger plate current swing than has heretofore been possible a proportional amount of the modulating signal is applied to the screen grid 23 of the pentode. Also a proportionate amount of the modulating signal is applied to the anode 21 to maintain said anode above the knee of the anode current versus anode voltage curve thus avoiding distortion which would occur if the potential of the anode decreased to said knee. This is accomplished by means of resistive circuits which impress proportionate amounts of the modulating signal upon the screen grid 23 and the plate 21. More specifically, the voltage divider comprised of resistors 26 and 27, and having a junction 37 therebetween is connected from the modulating signal source 35 to the battery 30. The junction 37 is connected to the screen grid electrode 23. Resistors 32 and 33 connect the output of the source 35 to the plate 21. The usual plate potential supply is represented by the battery 30 which is connected to the cathode 25 to permit one terminal of the source 35 to be connected to ground potential. The output signal of the modulator may be obtained by suitable connection to any point on load resistors 32 and 33. A utilizing circuit represented by block 34 is shown connected to junction 39 through the capacitor 94 which functions to prevent D.C. signals caused by variation of the anode 21, for example, from being supplied to the load 34.

In one design of the preferred embodiment of the invention the circuit constants of Fig. 1 may have the following values: Resistors 26, 27, 28, 29, 32, 33 and 71 may have values of 10, 27, 1000, 39, 2.7, 6.8 and 166 kilohms respectively. The batteries 30 and 31 may have values of negative 200 volts and negative 210 volts respectively. The relatively large grid bias potential (battery 31) is required by reason of the fact that the plate supply potential is supplied between cathode and ground. The pentode 20 may be of the type 5899.

It is to be noted that the values given above are primarily a matter of design, and that many different sets of values of resistances may be used depending upon the particular design selected. Similarly, other type pentodes may be utilized.

Figure 3:
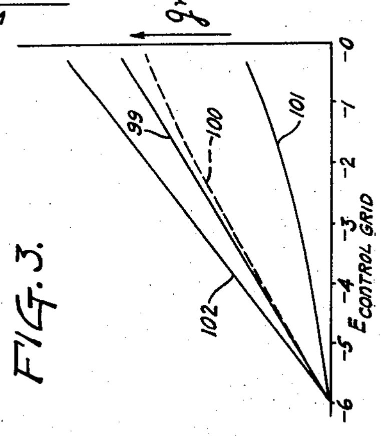
Fig. 3 shows curves of transconductance versus control grid potential under various conditions of screen grid potential.
Figure 2:
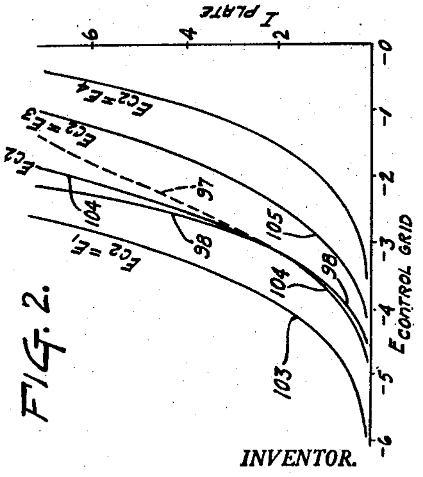
Fig. 2 is a set of typical curves of pentode plate current versus control grid voltage when the screen grid potential is maintained at a constant value and also shows curves of pentode plate current versus control grid voltage when the screen grid potential is varied.

The operation of the circuit of Fig. 1 now will be described in detail. Reference is made to Fig. 2 wherein there is shown a typical set of anode current versus control grid voltage curves for a pentode such as curves 103, 104 and 105 when the screen grid is held constant. Differentiation of any one of these curves represents the transconductance of the pentode over a range of control grid potentials for any given screen grid potential. For example the differentitation of the curve 104 produces the curve 99 which represents the transconductance versus control grid voltage when the screen grid potential is held constant at a value $E_2$. This curve is substantially linear. It can be seen that the transconductance (and also the gain of the tube since in a pentode it is proportional to the transconductance) has a particular slope which defines the variation in gain for any given change in control grid bias. This variation in gain for a given change in control grid potential would not be appreciably increased by holding the screen grid at higher constant potential although the amount of plate current would thereby be increased for a given control grid bias. Further in actual practice where the screen grid is connected to a battery source through an impedance, the larger plate current resulting from a higher screen grid supply operates to produce greater non-linearity in the circuit owning to the increased grid current, thus limiting the maximum plate current permissible within a range of operation having a given degree of linearity. For example curve 97 shows a typical curve of plate current versus control grid potential when the screen grid is connected to a battery supply through an impedance. It can be seen that the upper portion of the curve 97 drops off due to increased screen grid current and consequent decreased screen grid potential. Differentiation of curve 97 will produce a curve 100 as shown in Fig. 3 which is non-linear; the non-linearity increasing as the control grid potential and thus the plate current increases. This non-linearity will be increased if the plate current is increased by increasing the value of the screen grid battery supply since the screen grid current will then be greater.

Assume now that potential of the screen grid is caused to vary in the same manner but in a different degree as the potential of the control grid is varied. Thus, for example, if the control grid potential is increased linearly as a function of time, the potential of the screen grid will also be increased linearly as a function of time. The net result of such an arrangement is to produce changes in the transconductance of the tube with changes of the control grid potential which are in addition to the changes in transconductance of the tube caused by changes in control grid bias when the screen grid is held constant.

Curve 101 of Fig. 3 represents this additional change in transconductance. It will be observed that curve 101 is non-linear, but in opposition to the non-linearity of the curve 100. Thus the non-linearities of the two curves tend to cancel out thereby improving the overall linearity of the pentode. The resultant transconductance versus control grid bias relationship under these conditions is as represented by curve 102 which shows larger variations of gain for a given change in control grid bias than does curve 99 and which maintains a high degree of linearity at considerably larger plate currents than can be obtained by merely connecting the screen grid to a battery source through an impedance. The anode current versus control grid potential relationship from which curve 102 is derived is represented by curve 98 of Fig. 2.

Figure 4:
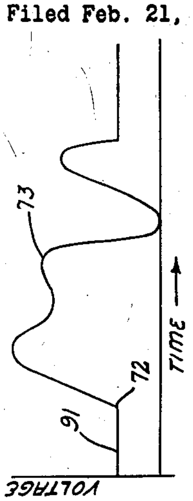
Fig. 4 is a curve of a modulating signal applied to the control grid electrode of the pentode from the modulating signal source of Fig. 1.

To illustrate a typical example of the operation of the circuit of Fig. 1, reference is made to Fig. 4 wherein the flat portion 91 of the curve represents the potential of the control grid 24 in the absence of a signal from the input carrier source 36 and when the modulating signal source is in its quiescent state, that is to say, when no modulating signal is being supplied by the modulating signal source 35. At point 72 the source 35 initiates a pulse of arbitrary shape which will produce a corresponding variation in the voltage at the control grid 24 of pentode 20 represented by the curved portion 73 of Fig. 4. This voltage signal is due to the signal from source 35 alone.

For reasons discussed at length hereinbefore a proportional amount of modulating signal is also applied to the screen grid 23. This is accomplished by the voltage divider comprising resistors 26 and 27. Thus, as the control potential varies in accordance with the amplitude of the modulating signal the potential of the screen grid will vary in a corresponding manner but in a different degree.

By means of resistors 32 and 33, which connect the output of the modulating source 35 to the plate 21 of the pentode 20, the potential of the plate 21 is caused to remain fairly constant with variations of the control grid potential due to the modulating signal. It is to be noted that it is a characteristic of the pentode that the potential of the plate 21 can be varied considerably without substantially changing the transconductance, and consequently without substantially changing the gain of the pentode, as long as the potential of the plate voltage remains above the knee of the plate current versus plate voltage curve. However, if the plate voltage is lowered below the knee of this curve a "virtual cathode" is formed in front of the suppressor grid 22. This "virtual cathode," with the suppressor grid 22 and the plate 21, acts somewhat like a triode so that changes in plate voltage will produce substantial changes in current flow to the plate. Thus, to obtain substantially linear modulation it is necessary to maintain the potential of the plate 21 above the knee of the plate voltage versus plate current curve. Variations in the plate 21 potential which are relatively slow compared to the frequency of the carrier signal will not appear in the output load 34 because of the coupling capacitor 94.

Figure 5:
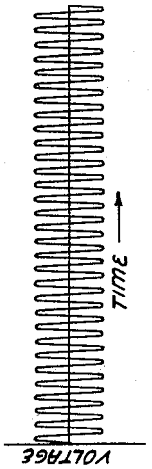
Fig. 5 is a typical waveform of a carrier signal employed in the circuit of Fig. 1.
Figure 6:
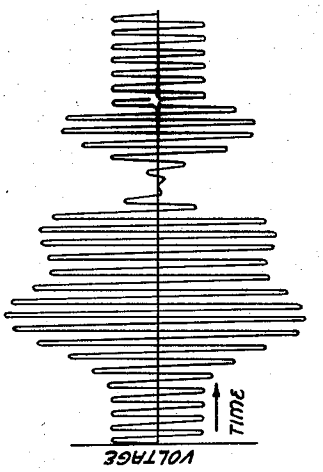
Fig. 6 is a curve of the modulated output signal of the circuit of Fig. 1.

The above discussion of operation, up to this point, has considered only the effect of a signal from the modulating signal source 35. Under normal operating conditions there will be present, simultaneously with the signal from the source 35, a carrier type signal from the input carrier source 36. This carrier signal, which is represented by the curve of Fig. 5, is applied to the control grid 24. As the gain of the pentode 20 is increased or decreased linearly as a function of the modulating signal applied to the control grid 24 and the screen grid 23 from modulator source 35, the amplitude of the carrier signal at the output of the pentode also is increased or decreased accordingly, as is shown in the resultant voltage waveform of Fig. 6, which represents the voltage output at junction 39 of Fig. 1. Since the gain of pentode 20 has been made to be a linear function of control grid voltage, the envelope of the modulated signal will be a faithful reproduction of the modulating signal supplied by source 35.

Figure 7:
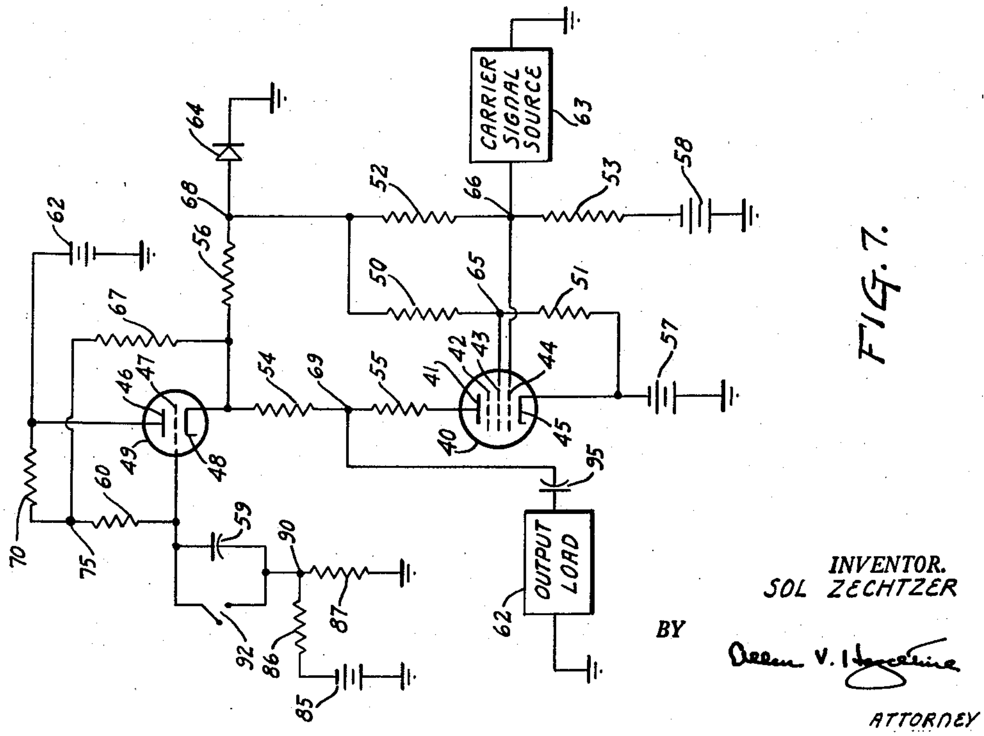
Fig. 7 is a schematic diagram of a form of the invention.

Referring now to Fig. 7 the circuit shown therein is generally similar to the circuit shown in Fig. 1 but has a specific circuit substituted for the modulating signal source 35 of Fig. 1. This circuit is comprised of a cathode follower circuit constructed to generate a signal whose amplitude increases linearly with time. The cathode follower circuit is comprised of the triode 49 having a plate 46 connected to battery 62, a control grid 47, and a cathode 48 connected through cathode resistors 54 and 55 to the plate 41 of pentode 40. Resistors 70 and 67 form a voltage divider circuit connected between the battery 62 and cathode 48. This voltage divider circuit functions to create a certain potential at the junction 75, which is connected to the control grid 47 through the resistor 60. A change in potential of the cathode 48 will thus be fed back to the grid 47 through the resistor 67 and the resistor 60. The battery 85 and the resistors 86 and 87 function to produce a potential at point 90 which, when the switch 92 is closed, is impressed upon the control grid 47 to produce only a small plate current in the triode 49. However, when the switch 92 is opened the capacitor 59 will charge in such a polarity as to cause the potential of the grid 47 to increase towards the potential of the point 75 as a function of time. As will be explained in detail later the effect of the feedback circuit connecting the cathode 48 to the control grid 47, and the effect of the charging of the capacitor 59, is to cause the potential of the grid 47 to rise in a linear manner with respect to time. The diode 64 is provided to establish ground potential as the approximate upper potential limit of the point 68, which is connected to the cathode 48 through the current limiting resistor 56. The current limiting resistor 56 restricts the current flow through the forward impedance of the diode 64 so that potential of the point 68 does not rise appreciably above ground potential.

The carrier signal source 63 is connected to the control grid 44 of the pentode 40 which also includes a plate 41, a suppressor grid 42, a screen grid 43, and a cathode 45.

The modulating signal which appears at point 68 is applied to the control grid 44 by means of a voltage divider comprised of resistor 52, resistor 53, and the junction 66 which connects the point 68 to the negative battery 58. The junction 66 is connected to the control grid 44 of the pentode 40. Resistors 50 and 51 form a voltage divider circuit having a junction 65 therein and connecting the point 68 to the negative battery 57. The junction 65 in this voltage divider is connected to the screen grid 43 of the pentode 40. This voltage divider circuit is designed to apply a proportionate amount of the modulating signal existing at point 68 to the screen grid 43 for reasons discussed in connection with Figs. 1, 2 and 3. Output load 62 is connected through capacitor 95 to the point 69 in the plate circuit of the pentode 40. Capacitor 95 performs the function of preventing D.C. signals from being supplied to the load 62. It is to be noted that the output signal can be taken from any point along the resistors 54 and 55. Point 69 merely represents a convenient choice.

The circuit shown in Fig. 7 may have the following values: Resistors 54, 55, 50, 51, 52, 53, 67, 70, 60, 56, 86 and 87 may have values of 2.7, 6.8, 10, 27, 1000, 39, 200, 820, 15,000, 2.2, 160 and 51 kilohms respectively. Batteries 62, 58, 57 and 85 may have values of positive 200 volts, negative 210 volts, negative 200 volts, and negative 200 volts respectively. Capacitor 59 may have a value of 0.68 microfarad. The pentode 40 may be of the type 5899 and the diode 64 may be of the type IN38. The triode 49 may be of the type 5703. For this particular design, the signal from the carrier signal source can have a maximum peak-to-peak voltage of about 2 volts, and a frequency range of from zero to about 7 megacycles.

Other sets of values also can be used according to specific requirements for a particular application.

The operation of the circuit shown in Fig. 7 now will be described in detail. This circuit is a special case of the general circuit of Fig. 1, and is adapted to produce a modulated signal whose amplitude increases linearly with time. This is accomplished by impressing upon the control grid 44 a modulating signal which increases linearly with time while simultaneously applying proportional amounts of said modulating signal to screen grid 43 and the anode 41.

The modulating signal is generated in the following manner. Assume that under quiescent conditions the switch 92 is closed, thus short circuiting capacitor 59. The control grid 47 is then at a potential of about −32 volts and the cathode 48 is at a potential of a few volts positive with respect to control grid 47. If now the switch 92 is opened, the capacitor 59 will begin to charge through resistor 60 to the potential of point 75, thus increasing the potential of the control grid 47 of triode 49. Normally the rise in potential of grid 47 will be exponential in nature following the exponential rise across capacitor 59. However, as the potential of grid 47 rises, the plate current of triode 49 increases and the potential of the cathode 48 increases. An increase of the potential of cathode 48 has the effect of decreasing the potential drop across the voltage divider comprising resistor 70 and resistor 67. A drop in potential across this divider causes the potential at point 75 to rise toward the potential of battery 62. If the rise at point 75 is made equal to the rise in potential across capacitor 59, a constant current will flow through resistor 60 causing capacitor 59 to be charged at a linear rather than an exponential rate. Linear charging of capacitor 59 will cause a linear increase in potential at grid 47 and a corresponding linear increase in the potential at cathode 48. The rise in potential across capacitor 59 can be made to be linear within about 5 percent. Cathode 48 is connected to ground through a series circuit comprising resistor 56 and diode 64. The potential at junction 68 between resistor 56 and diode 64 will rise linearly with the rise in potential of cathode 48 as long as the potential at point 68 is negative with respect to ground. However, when the potential at cathode 48 has risen to such a value that the potential at point 68 increases to just a little above ground potential, diode 64 starts to conduct and prevents any further rise in potential at the point 68. The linear rise in potential across capacitor 59 will be limited by saturation effects in tube 49. However, this levelling off of the rise in potential of the capacitor 49 occurs after terminal 68 has reached ground potential and therefore the saturation effects in tube 49 will not affect the linearity of the pulse appearing at point 68.

Figure 8:
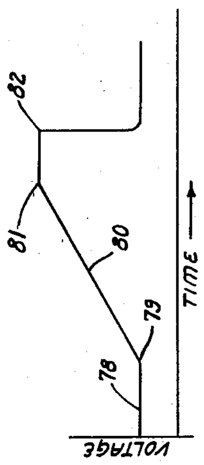
Fig. 8 shows a waveform of a linear sweep modulating signal employed in the circuits of Figs. 6 and 7.
Figure 9:
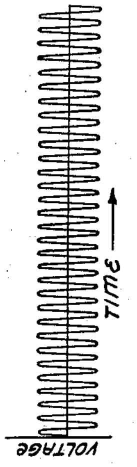
Fig. 9 is a typical waveform of a carrier signal used in the circuit of Fig. 6.
Figure 10:
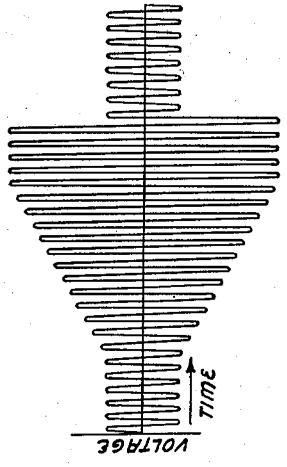
Fig. 10 is a curve of the modulated output signal of the circuits of Figs. 6 and 7.

The linear sweep voltage generated at point 68 is impressed through the voltage divider comprised of resistors 52 and 53 to supply a voltage waveform as shown in Fig. 8 to the control grid electrode 44 of tube 40. In Fig. 8 the portion 78 of the curve represents the potential of grid 44 of pentode 40 when the switch 92 is closed and in the absence of a carrier signal from the source 63. Point 79 corresponds with the point in time at which the switch 92 is opened and the portion 80 of the curve represents the potential of the control grid 44 caused by the sweep pulse being generated at the cathode 48 of the triode 49. Point 81 corresponds to the levelling-off of the sweep pulse due to the action of the diode 64. At the time corresponding to point 82 the switch 92 is closed and the voltage drops rapidly to quiescent condition. The sweep pulse generated at point 68 is further impressed through the voltage divider comprised of resistors 50 and 51 upon the screen grid electrode 43 to increase the potential of the screen grid as the potential of the control grid increases, thus producing a greater variation of substantially linear gain over a larger plate current swing than would be obtained by connecting the screen grid to a constant battery supply through an impedance. Further, the plate 41 of tube 40 is maintained at substantially constant potential since the increase of potential of the cathode 48 of triode 49 compensates for the tendency of the potential of the plate 41 to decrease as the current therein increases.

As the voltage of the grid 44 increases, the gain of the modulator circuit increases linearly therewith. Consequently the amplitude of the carrier signal will be modulated by the modulating signal to produce a resultant output signal at junction 69 which has a large variation in gain for a given change in the amplitude of the modulating signal and whose envelope varies as a linear function of the modulating signal. Since the amplitude modulating signal varies as a linear function of time, the amplitude of the modulated signal appearing at junction 69 also will vary as a linear function of time.

It is to be understood that the forms of the invention herein shown and described are but preferred embodiments of the same, and that various changes may be made in circuit arrangement, values of circuit constants, and type vacuum tubes used without departing from the spirit or scope of the invention.

What I claim is:

1. An electronic circuit comprising a pentode, said pentode comprising a cathode, a control grid, a screen grid, and an anode, means for applying an input signal to said control grid, means for applying to said screen grid a proportional amount of said input signal to increase the gain of said pentode, and means for maintaining the potential of said anode above the knee of the anode current versus anode potential curve of said pentode.

2. In an amplitude modulator circuit, a pentode comprising a cathode, a control grid, a screen grid, and an anode, means for supplying a modulating signal to said control grid, means for supplying a proportional amount of said modulating signal to said screen grid to increase the gain of said pentode, and means for supplying a proportionate amount of said modulating signal to said anode to maintain the potential of said anode above the knee of the anode current versus anode potential curve of said pentode.

3. In an amplitude modulating circuit, a pentode vacuum tube comprising a cathode, a control grid, a screen grid and an anode, means for supplying a modulating signal to said control grid, means for supplying a proportionate amount of said modulating signal to said screen grid to increase the gain of said pentode, means for supplying a proportionate amount of said modulating signal to said anode to maintain the potential of the anode above the knee of the anode current versus anode potential curve of said pentode, and means for supplying the signal to be modulated to the control grid.

4. An electronic circuit comprising a pentode, said pentode comprising a cathode, a control grid, a screen grid, and an anode, means for maintaining the potential of the anode above the knee of the anode current versus anode potential curve, means for applying to said screen grid a bias which tends to decrease with increase of screen grid current, means for supplying an input signal to said control grid, and means for supplying said input signal to said screen grid electrode at an amplitude level at least sufficient to compensate for decrease of the screen grid bias owing to increase of screen grid current.

5. An amplitude modulating circuit comprising a pentode vacuum tube, said pentode vacuum tube comprising a cathode, a control grid electrode, a screen grid electrode, and an anode, a terminal, means for supplying a modulating signal to said terminal, a first voltage divider means constructed and arranged to impress said modulating signal appearing at said terminal upon said control grid electrode, a second voltage divider means constructed and arranged to impress a proportionate amount of said modulating signal appearing at said terminal upon said screen grid electrode to increase the gain of said pentode, resistive means connecting said terminal to said anode for maintaining the potential of the anode above the knee of the anode current versus anode potential curve, battery means arranged to supply anode potential to said pentode, and means for applying the signal to be modulated to said control grid electrode.

6. An amplitude modulating circuit comprising a pentode vacuum tube, said pentode vacuum tube comprising a first cathode, a first control grid electrode, a screen grid electrode, and a first anode, a triode vacuum tube comprising a second cathode, a second control grid electrode, and a second anode, a first resistive network connecting the cathode of said triode to the anode of said pentode to maintain the potential of the anode of said pentode above the knee of the anode potential versus anode current curve, a first voltage source, capacitive means connecting said first voltage source to the said second control grid electrode, a switching means constructed to shunt said capacitive means when closed, a feedback means connected from the cathode of said triode to the control grid electrode of said triode and constructed to cooperate with said capacitive means to cause the potential of said second control grid electrode to increase in a linear manner when said switching means is opened, a resistive means connected between said second cathode and said first control grid electrode and constructed to impress a proportionate amount of the potential variation of said second cathode upon said first control grid electrode to vary the anode current of said pentode, a potential divider constructed to impress a proportionate amount of the potential of said second cathode upon said screen grid electrode to increase the gain of said pentode, and means for impressing the signal to be modulated upon said first control grid electrode.

7. An amplitude modulating circuit comprising a pentode tube, said pentode tube comprising a first cathode, a first control grid electrode, a screen grid electrode, and a first anode means, a triode tube, said triode tube comprising a second cathode, a second control grid electrode, and a second anode means, a first resistive means having a first terminal connected to said second cathode, voltage clamping means constructed and arranged to limit the potential of the second terminal of said first resistive means to a predetermined maximum value, feedback circuit means constructed and arranged to impress upon said second control grid electrode a proportionate amount of the potential variation of said second cathode, a battery, a capacitive means connecting said battery to said second control grid electrode, a switching means adapted to shunt said capacitive means when closed, a second resistive means connecting the said second cathode to said first anode means to maintain the potential of the latter above the knee of the anode potential versus anode current curve, a first potential divider constructed and arranged to supply a proportionate amount of the potential appearing at the second terminal of said first resistive means to said first control grid electrode to vary the anode current of said pentode, a second potential divider constructed and arranged to supply a proportionate amount of the potential appearing at said second terminal of said first resistive means to said screen grid electrode to increase the gain of said pentode, and means for supplying the signal to be modulated upon said first control grid electrode.

References Cited in the file of this patent

UNITED STATES PATENTS 2,450,445 Rosencrans ---------------- Oct. 5, 1948